(12) United States Patent
Nakada et al.

(10) Patent No.: US 11,731,613 B2
(45) Date of Patent: Aug. 22, 2023

(54) PARKING ASSISTANCE DEVICE, PARKING ASSISTANCE METHOD, AND COMPUTER PROGRAM PRODUCT

(71) Applicant: HONDA MOTOR CO., LTD., Tokyo (JP)

(72) Inventors: Yuki Nakada, Wako (JP); Hiroshi Yamanaka, Wako (JP); Yuki Hara, Wako (JP); Yasushi Shoda, Wako (JP); Syoichi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 17/118,729

(22) Filed: Dec. 11, 2020

(65) Prior Publication Data

US 2021/0179088 A1 Jun. 17, 2021

(30) Foreign Application Priority Data

Dec. 13, 2019 (JP) ................................ 2019-225910

(51) Int. Cl.
*B60W 30/06* (2006.01)

(52) U.S. Cl.
CPC ......... *B60W 30/06* (2013.01); *B60W 2554/20* (2020.02)

(58) Field of Classification Search
None
See application file for complete search history.

(56) References Cited

U.S. PATENT DOCUMENTS

2016/0107691 A1\* 4/2016 Goldmann ......... B62D 15/0285
  701/41
2019/0291722 A1 9/2019 Maeda et al.

FOREIGN PATENT DOCUMENTS

JP 2017-213943 A 12/2017
JP 2018-083480 A 5/2018

\* cited by examiner

*Primary Examiner* — Peter D Nolan
*Assistant Examiner* — Jacob Kent Besteman-Street
(74) *Attorney, Agent, or Firm* — Rankin, Hill & Clark LLP

(57) ABSTRACT

A parking assistance device including a recognition part configured to acquire recognition information through recognition of surroundings, a parking region determiner configured to determine a space between other vehicles as a parking region of the host vehicle based on the recognition information, an automatic parking controller configured to perform a parking operation to park the host vehicle in the parking region, and a parking location determiner. In response to determining that an entry width of the parking region is less than a predetermined value, the parking location determiner is configured to determine a parking location of the host vehicle in the parking region that is at a central location as viewed from an entry side of the parking region. In response to determining that the entry width is equal to or greater than the predetermined value, the parking location determiner is configured to determine the parking location that is closer to one of the other vehicles as viewed from the entry side.

13 Claims, 12 Drawing Sheets

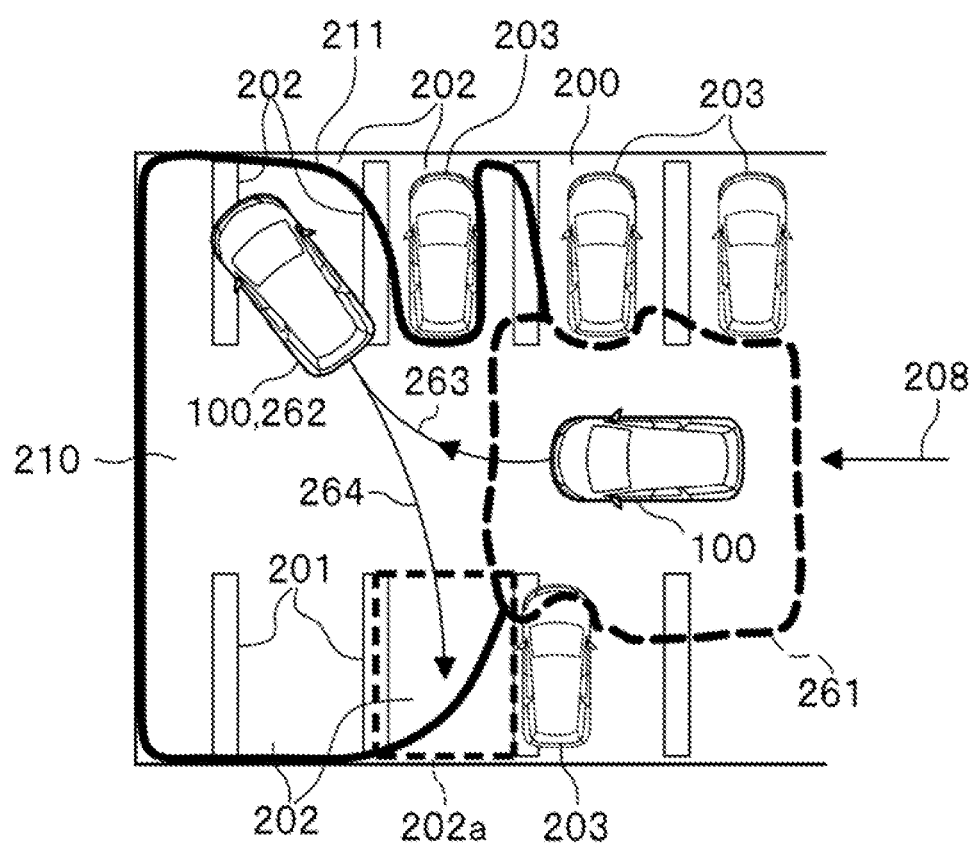

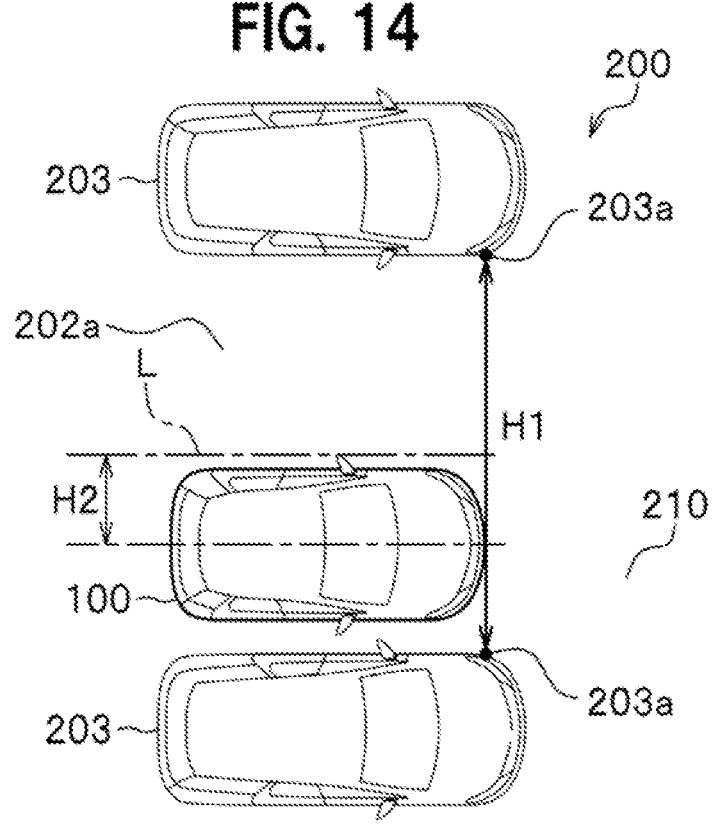

PARKING ASSISTANCE DEVICE, PARKING ASSISTANCE METHOD, AND COMPUTER PROGRAM PRODUCT

CROSS-REFERENCE TO RELATED APPLICATIONS

This application is based upon and claims the benefit of priority from Japanese Patent Application No. 2019-225910 filed Dec. 13, 2019, the entire contents of which are incorporated herein by reference.

BACKGROUND

Technical Field

The disclosure relates to a parking assistance device, parking assistance method and computer program product.

Related Art

Patent Literature 1 (Japanese Unexamined Patent Application Publication No. 2018-83480) discloses a technology for setting an automatic parking location of a host vehicle within a parking region of a parking area when the parking area has parking regions for individual vehicles separated by boundary lines. According to the disclosed technology, the parking location within the parking region is set based upon positions of neighboring vehicles and is offset either to the left or right depending on these positions.

Patent Literature 2 (Japanese Unexamined Patent Application Publication No. 2017-213943) discloses a technology for recognizing a parking location in a parking area where parking regions for individual vehicles are not separated by boundary lines. According to the disclosed technology, the parking location is recognized based on a first corner location and second corner location of a parking region, wherein the first corner location is a near-side corner location of a vehicle entry part of the parking region and the second corner location is a rear-side corner location of the vehicle entry part that are based on an image taken by an on-board camera.

In the case where a parking area does not have a boundary line separating parking regions in which individual vehicles park, when a parking region is available for a host vehicle to park in and that parking region has a lot of space, by selecting a parking location of the host vehicle without taking into consideration a possibility that the parking region would be used by another vehicle after the host vehicle is parked, efficient utilization of space by individual vehicles within the parking area will be jeopardized. Furthermore, by parking the host vehicle in such a parking region with no consideration regarding efficient use of space, there is likelihood that the host vehicle would be left with unsatisfactory spaces on both its sides once an adjacently parked vehicle has left.

SUMMARY

One aspect of the disclosure provides a parking assistance device including a recognition part configured to acquire recognition information through recognition of surroundings of a host vehicle, a parking region determiner configured to determine a space between other vehicles as a parking region of the host vehicle based on the recognition information, an automatic parking controller configured to perform a parking operation to park the host vehicle in the parking region, and a parking location determiner, wherein in response to determining that an entry width of the parking region is less than a predetermined value, the parking location determiner is configured to determine a parking location of the host vehicle in the parking region that is at a central location as viewed from an entry side of the parking region, and in response to determining that the entry width is equal to or greater than the predetermined value, the parking location determiner is configured to determine the parking location that is closer to one of the other vehicles as viewed from the entry side of the parking region.

BRIEF DESCRIPTION OF DRAWINGS

FIG. 3C is a top view of a parking area for explaining a situation where a vehicle installed with an automatic parking control unit according to at least one embodiment searches for a space to perform a parking maneuver.

FIG. 14 is a plan view of a parking area for explaining a parking location determination process of S6 that is executed by an automatic parking control unit according to at least one embodiment.

DETAILED DESCRIPTION

Figure 1:
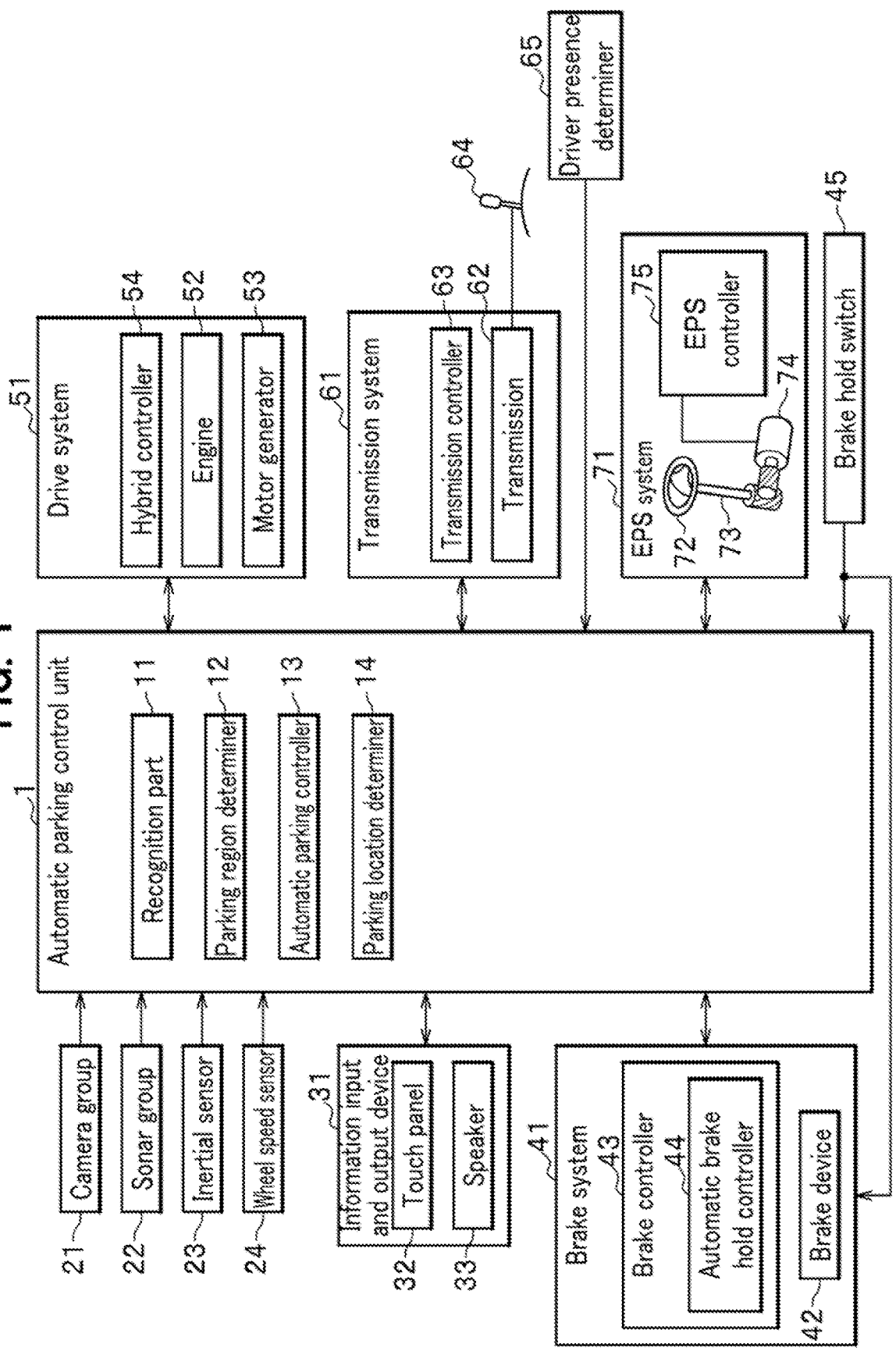
FIG. 1 is a block diagram of a system configuration in accordance with at least one embodiment centered on an automatic parking control unit according to at least one embodiment.

An object of the disclosure is to provide a parking assistance device that parks a vehicle at a parking location that allows an efficient use of space in a parking area.

One aspect of the disclosure provides a parking assistance device that is able to park a vehicle at a parking location that allows an efficient use of space in a parking area.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments according to the disclosure is described below with reference to drawings. Directions to the front, back, left, and right referred to in the description are in accordance with the arrows shown in the drawings.

Figure 2:
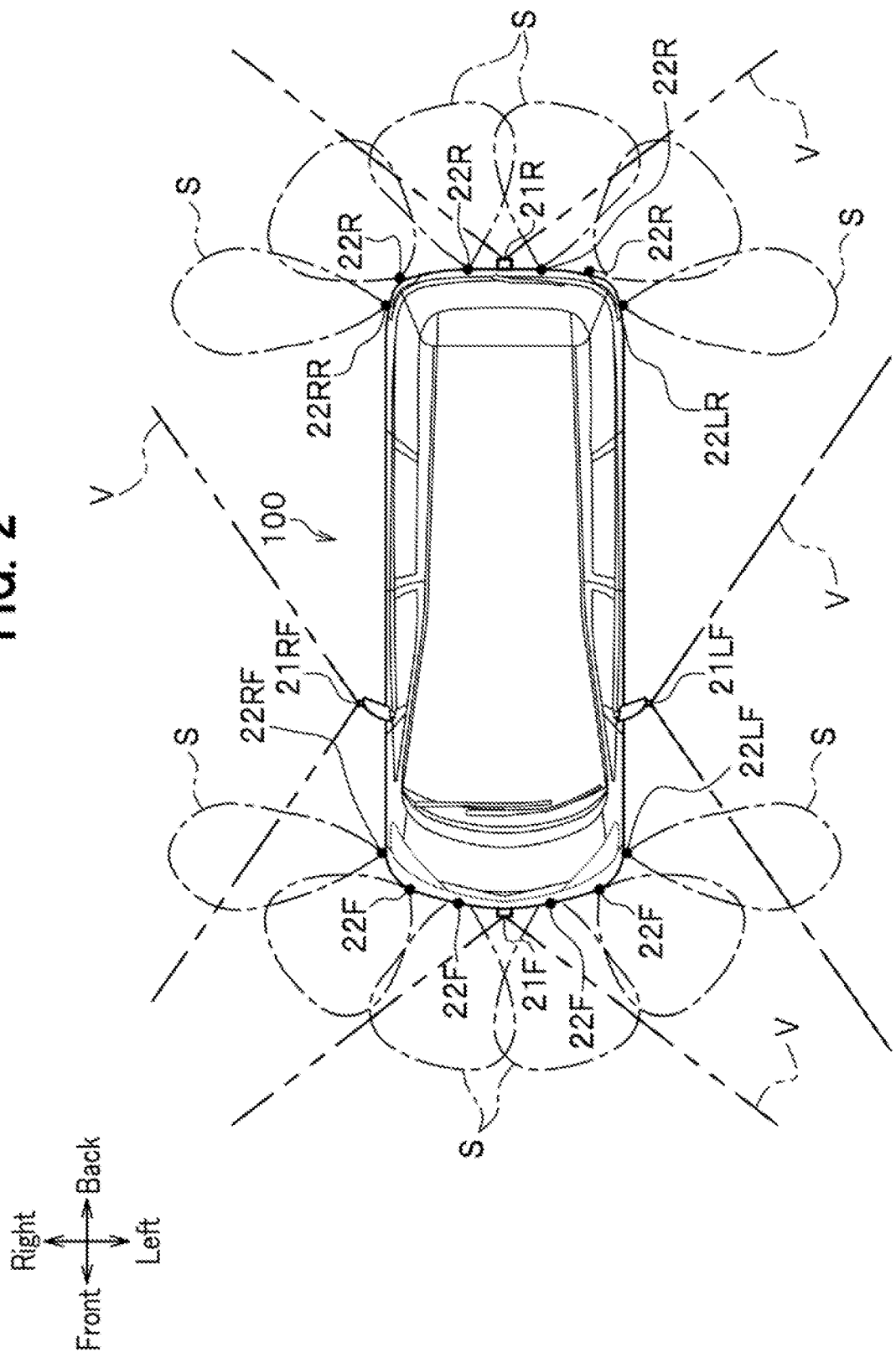
FIG. 2 is a top view of a vehicle installed with an automatic parking control unit according to at least one embodiment showing the positions of cameras and sonars installed on the vehicle.

FIG. 1 is a block diagram showing a system configuration of an embodiment centered on an automatic parking control unit 1. FIG. 2 is a top view of a host vehicle 100 equipped with the system of FIG. 1.

The automatic parking control unit 1 is an electronic control unit (ECU) for automatic parking that is installed on board the host vehicle 100. The automatic parking control unit 1 is an embodiment of a parking assistance device of the disclosure and is configured mainly from a microcomputer and realizes the functions of the following various control parts through executing a process based on a control program. The automatic parking control unit 1 operates based on a program characteristic to the disclosure and carries out a parking assistance method of the disclosure through this operation. A recognition part 11 acquires recognition information including image data and sonar data by recognizing the surroundings with a camera group 21 and sonar group 22 (the camera group 21 and sonar group 22 are described later). Based on this recognition information, a parking region determiner 12 determines a space between other vehicles as a parking region of the host vehicle 100. A "parking region" refers to a space within a parking area where the host vehicle 100 may be parked with appropriate spacing with an obstacle or another vehicle. Here, a parking area includes ones where parking spaces (parking regions) in which individual vehicles park are not separated, for example, with a boundary line such as a white line (in other words, a parking area with undefined parking spaces). An automatic parking controller 13 carries out control of a parking operation of the host vehicle 100 into a parking region.

A parking location determiner 14 determines a parking location of the host vehicle 100 in a parking region. When a width of the parking region on a side from which the host vehicle 100 enters the parking region (hereinafter an "entry width") is less than a predetermined value, the parking location determiner 14 sets the parking location to a center of the parking region as viewed from an entry side thereof.

A "parking location" is a specific location in a parking region where the host vehicle 100 is to be parked. When, on the other hand, the entry width is equal to or greater than the predetermined value, the parking location determiner 14 sets the parking location to a location that is closer to one of the other vehicles as viewed from the entry side of the parking region.

In some embodiments, when the parking location determiner 14 sets the parking location of the host vehicle 100 to a location that is closer to one of the other vehicles as viewed from the entry side of the parking region, that location is set so that there is a predetermined space with the other vehicle on which side the parking location is closer to.

In some embodiments, when the parking location of the host vehicle 100 is set to a location that is closer to one of the other vehicles as viewed from the entry side of the parking region, the parking location determiner 14 sets a "shift distance", a distance by which the parking location is shifted to be closer to the one of the other vehicles, to a predetermined distance. This shift distance is a distance from a line extending from a central point of the parking region as viewed from the entry side thereof to the rear side of the parking region.

In some embodiments, the parking location determiner 14 sets reference points of the entry width of the parking region to corners of the other vehicles.

In some embodiments, to which of the other vehicles the parking location is to be closer to is decided by the parking location determiner 14 based on the position of the host vehicle 100.

In some embodiments, the parking location determiner 14 may decide on which of the other vehicles the parking location is to be closer to by prioritizing a ground surface condition of a parking area where the host vehicle 100 performs the parking operation (ground surface condition precedence).

In some embodiments, the parking location determiner 14 may decide on which of the other vehicles the parking location is to be closer to by prioritizing a type of each of the other vehicles (other vehicles types precedence).

The automatic parking control unit 1 is connected to a camera group 21 and sonar group 22. Note that each component that is connected to the automatic parking control unit 1 (with the connection as indicated by a line in the drawing of FIG. 1) may have a wire connection with the automatic parking control unit 1 or may have a connection via a Controller Area Network (a CAN).

The camera group 21 is a group of cameras that the host vehicle 100 is installed with as shown in FIG. 2. The host vehicle 100 is equipped at the front thereof with a front camera 21F that captures an image of a view in front of the host vehicle 100. Furthermore, the host vehicle 100 is equipped at the rear thereof with a rear camera 21R that captures an image of a view at the back of the host vehicle 100. Yet further, the host vehicle 100 is equipped on the right side thereof towards the front with a side camera 21RF that captures an image of a view to the right of the host vehicle 100. Yet further, the host vehicle 100 is equipped on the left side thereof towards the front with a side camera 21LF that captures an image of a view to the left of the host vehicle 100. The side cameras 21RF and 21LF may each be installed on the tip of a side mirror or away from a side mirror to prevent the side mirrors from obstructing the views that are captured by the cameras. The side cameras 21RF and 21LF may each be installed somewhere at some distance away from a side mirror.

The sonar group 22 is a group of cameras that the host vehicle 100 is installed with as shown in FIG. 2. The host vehicle 100 is equipped at the front thereof with four front sonars 22F that are arranged apart at substantially equal intervals. The four front sonars 22F detect an obstacle in front of the host vehicle 100. Furthermore, the host vehicle 100 is equipped at the rear thereof with four rear sonars 22R that are arranged apart at substantially equal intervals. The four rear sonars 22R detect an obstacle at the back of the host vehicle 100. The front sonars 22F detect an obstacle in the direction of travel when the host vehicle 100 is moving forward. The rear sonars 22R detect an obstacle in the direction of travel when the host vehicle 100 is moving in reverse.

Furthermore, the host vehicle 100 is equipped with a single side sonar 22RF on a front portion of the right side of the host vehicle 100. The side sonar 22RF detects an obstacle at the front right of the host vehicle 100 to the right of the host vehicle 100. Yet further, the host vehicle 100 is equipped with a single side sonar 22LF on a front portion of the left side of the host vehicle 100. The side sonar 22LF detects an obstacle at the front left of the host vehicle 100 to the left of the host vehicle 100. Yet further, the host vehicle 100 is equipped with a single side sonar 22RR on a back portion of the right side of the host vehicle 100. The side sonar 22RR detects an obstacle at the back right of the host vehicle 100 to the right of the host vehicle 100. Yet further, the host vehicle 100 is equipped with a single side sonar 22LR on a back portion of the left side of the host vehicle 100. The side sonar 22LR detects an obstacle at the back left of the host vehicle 100 to the left of the host vehicle 100. Each of the side sonars 22RF, 22LF, 22RR, and 22 LR detects an obstacle that may be in the path of the host vehicle 100. In FIG. 2, a broken line S indicates a spatial range where the individual sonars detect an obstacle. The broken line V indicates a range of view of individual cameras.

Note that the number of cameras and sonars and their installed locations are not limited to the description given above. The number of cameras and sonars may be increased or decreased. The locations of the cameras and sonars may be changed. In some embodiments, the numbers and locations of one or more cameras and one or more sonars are selected so that the situation around the circumference of the host vehicle 100 is detectable.

Furthermore, a sensor other than a camera or a sonar may be used to detect the surrounding situation of the host vehicle 100. For example, the host vehicle 100 may be equipped with a radar. The radar includes a function to acquire distribution information of a target by irradiating a target with a radar wave and receiving a radar wave reflected from the target, the target including another vehicle driving in front of the host vehicle 100, and the distribution information of the target including a distance to the target and a direction of the target. For the radar wave, a laser, a microwave, a millimeter-wave, or an ultrasonic wave may for example be used as deemed appropriate.

Furthermore, the host vehicle 100 may be equipped with a LIDAR (Light Detection and Ranging). The LIDAR includes, for example, a function to detect a presence of a target and a distance to the target by measuring the time taken to detect scattered light in response to irradiation of light.

In the description that follows, an example is used where the host vehicle 100 detects its surrounding area through a combined used of the camera group 21 and sonar group 22.

Referring back to FIG. 1, the automatic parking control unit 1 is connected to an inertial sensor 23 and a wheel speed sensor 24. The inertial sensor 23 is a sensor that detects the acceleration of the host vehicle 100. The wheel speed sensor 24 is a sensor that detects the wheel speed of each of the wheels of the host vehicle 100.

Furthermore, the automatic parking control unit 1 is connected to an information input and output device 31. The information input and output device 31 includes a touch panel 32 and a speaker 33. The main body of the information input and output device 31 is arranged in the vicinity of a drivers seat to allow the driver to operate, for example, the touch panel 32. The information input and output device 31 may display various information on the touch panel 32, output various audio output with the speaker 33, and accept various operations through the touch panel 32.

In other words, through the use of the information input and output device 31, car navigation information that has been prepared, for example, based on information from a satellite navigation system, may be displayed on the touch panel 32 or output as audio from the speaker 33 or both. This car navigation information may also include information received from the Vehicle Information and Communication System (VICS [a registered trademark]).

Furthermore, the information input and output device 31 may receive TV and radio broadcast and display images on the touch panel 32 and output audio from the speaker 33. Yet further, the information input and output device 31 may include an optical disc drive (not shown) and read data from media such as a CD (a compact disc), DVD (a digital versatile disc or digital video disc), and BD (a Blu-ray Disc). Yet further, the information input and output device 31 may include an HOD (a hard disk drive, not shown) and play music recorded thereon.

Yet further, the information input and output device 31 may be used to output various messages from the host vehicle 100 or a device installed on the host vehicle 100 (e.g., an ETC [Electronic Toll Collection] in-vehicle device) and accept various operations for the installed device.

The automatic parking control unit 1 is connected to a brake system 41, The brake system 41 is a system for performing the braking of the host vehicle 100. The brake system 41 includes a brake device 42 that performs the braking of the host vehicle 100 and a brake controller 43 that controls the brake device 42. The brake controller 43 includes a function of an automatic brake hold controller 44. The automatic brake hold controller 44 realizes an automatic brake hold control part. The brake device 42 generates hydraulic pressure (oil pressure) thereby supplying hydraulic pressure to a wheel cylinder of each wheel to generate friction braking force. Note that the brake system 41 may use a regenerative brake in conjunction when the host vehicle 100 is, for example, a hybrid vehicle. The brake device 42 is, for example, a device where a brake-by-wire system is applied. Therefore, the brake device 42 may generate braking force irrespective of a brake pedal operation (a brake pedal is not shown in drawings). Furthermore, the brake device 42 may be a system installed with an electric brake booster. In this case, braking force may be generated with the electric brake booster irrespective of a brake pedal operation. The brake controller 43 is a controller for controlling the brake device 42.

The automatic brake hold controller 44 is a function that is included as part of the brake controller 43 and controls an automatic brake hold function. The automatic brake hold function is a function for maintaining a braking state of the host vehicle 100 when the driver releases his foot from a brake pedal (not shown) after the brake pedal has been pressed. Note that with the automatic brake hold function, the host vehicle 100 is released from the automatic brake hold state when a predetermined condition is met, such as when an accelerator pedal (not shown) is operated. The automatic brake hold state may be turned on and off by operating a brake hold switch 45 installed close to the driver's seat of the host vehicle 100.

The automatic parking control unit 1 is connected to a drive system 51. The drive system 51 is a system to drive the host vehicle 100. In the given example, the host vehicle 100 is a hybrid vehicle that includes as its driving source an engine 52 and a motor generator 53. A hybrid controller 54 drives the host vehicle 100 by controlling the engine 52 and motor generator 53. Note that the host vehicle 100 is not limited to a hybrid vehicle. When, for example, the host vehicle 100 is a gasoline-powered vehicle, the engine 52 is the driving source. When, as another example, the host vehicle 100 is an electric vehicle including a fuel-cell vehicle, a motor is the driving source.

A transmission system 61 is a system for carrying out, gear changes of the host vehicle 100. The transmission system 61 includes a transmission 62 that performs a gear change of the host vehicle 100, a transmission controller 63 that controls the transmission 62, and a gearshift 64 that is connected to the transmission 62. The transmission 62 may be an automatic transmission or a manual transmission, With the transmission system 61 described here, a gear change may be carried out without driver operation and through the transmission controller 63 controlling the transmission 62, in which case the transmission controller 63 moves the position of the gearshift 64 in accordance with the gear change.

The automatic parking control unit 1 is connected to a driver presence determiner 65. The driver presence determiner 65 determines whether a driver is present in the driver's seat.

The automatic parking control unit 1 is connected to an electric power steering system 71 (an EPS system 71). The EPS system 71 is a system configured to assist the steering of the driver. The EPS system 71 includes a steering axle 73 with a steering wheel 72, a drive motor 74 that drives the rotation of the steering axle 73, and an EPS controller 75 that controls the drive motor 74. The EPS system 71 rotates the steering axle 73 using the drive motor 74 as a driving source thereby assisting the steering operation of the driver turning the steering wheel 72.

Next, the effect of the system centered on the automatic parking control unit 1 is described.

In the subsequent description, the phrase "automatic parking operation" refers to a series of operations described in the flowcharts of FIGS. 4 and 5 (described later) that involves the automatic parking control unit 1 performing automatic operation of the host vehicle 100 through the control of individual systems and driving the host vehicle 100 to perform automatic parking. The phrase "automatic parking function" refers to the entire process indicated by the flowcharts of FIGS. 4 and 5 concerning automatic parking that the automatic parking control unit 1 takes a central role executing (note that the entire process includes the "automatic parking operation").

Figure 3A:
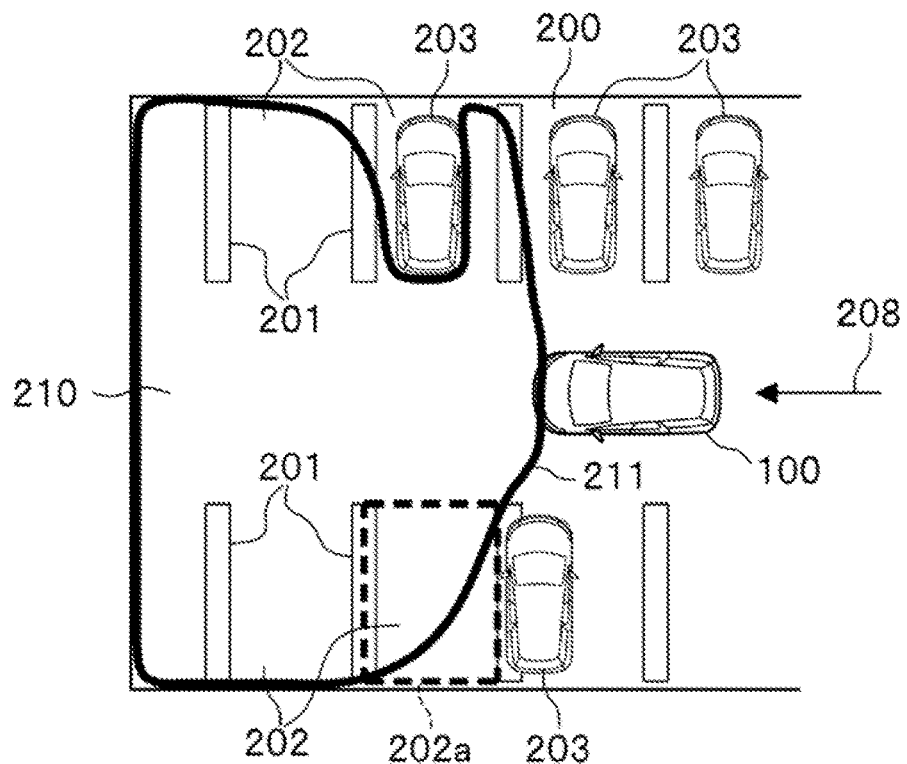
FIG. 3A is a top view of a parking area for explaining a situation where a vehicle installed with an automatic parking control unit according to at least one embodiment searches for a space to perform a parking maneuver.
Figure 3B:
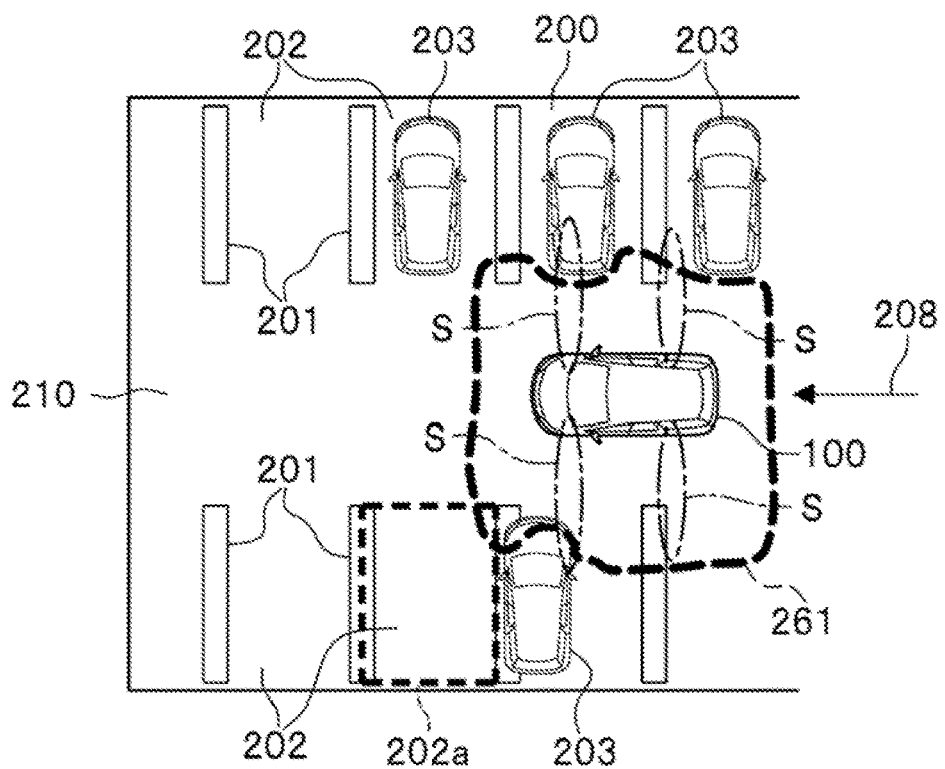
FIG. 3B is a top view of a parking area for explaining a situation where a vehicle installed with an automatic parking control unit according to at least one embodiment searches for a space to perform a parking maneuver.

The automatic parking control unit 1 carries out the control of automatic parking. To do this, the automatic parking control unit 1 detects a space to perform a parking maneuver in a place such as a parking area by using the camera group 21 and sonar group 22. FIGS. 3A-3C are top views of the host vehicle 100 for explaining a situation where the host vehicle 100 searches for a space to perform a parking maneuver.

FIG. 3A is a top view showing a situation where the host vehicle 100 searches for a space to carry out a parking maneuver in a parking area 200 through the use mainly of the front camera 21F of the camera group 21. To the host vehicle 100 that has entered the parking area 200, there are multiple parking spaces 202 (parking regions) separated by white lines 201 (boundary lines) that are arranged on the left and right. Some parking spaces 202 are already in use by other vehicles 203 but some are vacant. A driver of the host vehicle 100 drives the host vehicle 100 to advance slowly along a passage 210 of the parking area 200 in a direction of travel 208. Although the parking area 200 of the drawing shows parking spaces 202 on both sides of the passage 210, there are cases where parking spaces 202 are available on one side and not on the other.

From an image captured by the front camera 21F (Ha 2), a region 211 may be recognized as a space that is available for the host vehicle 100 to perform a parking maneuver. By performing predetermined image processing on the image captured by the front camera 21F, a difference in luminance levels may be recognized, and in this way, the host vehicle 100 may recognize the region 211 that is available for use to perform a parking maneuver. Camera recognition is good at recognizing a white line 201. Camera recognition also includes a space recognition function. However, camera recognition is not good at recognizing objects such as snow, a white wall, and another vehicle close by. For this reason, control of the brake to avoid colliding with obstacles when performing automatic parking is difficult with only the image captured by the front camera 21.

The sonar group 22 is therefore used in combination. FIG. 3B is a top view showing a situation where all the sonars of the sonar group 22 are used to search for a space to perform a parking maneuver in the parking area 200. Sonars are capable of detecting an obstacle by transmitting and receiving sound waves and, in comparison to a camera, is good at detecting an obstacle close by. Therefore, a sonar may be used to accurately perform brake control against an obstacle. Furthermore, because a sonar has a higher space recognition function than a camera, the sonar group 22 is useful when deriving various parking patterns. FIG. 3B shows a region 261 that is available for use when performing a parking maneuver as recognized by the sonar group 22.

FIG. 3C is a top view showing both the region 211 and region 261. Through the combined use of the front camera 21F and sonar group 22, a wide space may be recognized as a space available for use to perform a parking maneuver. Furthermore, the combined use enables a better brake control for avoiding an obstacle. In the example of FIG. 3C, a parking space 202*a* is decided as a parking region in which the host vehicle 100 is to park through automatic parking. A space further down on the right as viewed from the host vehicle 100 is unoccupied and this location is decided as a location ("a change-to-reverse location") where the host vehicle 100 stops before moving in reverse. The example shows how the host vehicle 100 may be parked through automated parking by (a) moving and steering the host vehicle 100 forward to the right (as shown by an arrow 263), (b) stopping the host vehicle 100 temporarily at the change-to-reverse location 262, and (c) turning back the steering wheel and moving the host vehicle 100 in reverse so that the host vehicle 100 enters the parking space 202*a* (a parking region) (as shown by an arrow 264).

The above has been an outline of automated parking in which the front camera 21F is used in combination with the sonar group 22. A detailed description of a process of automated parking now follows.

Figure 4:
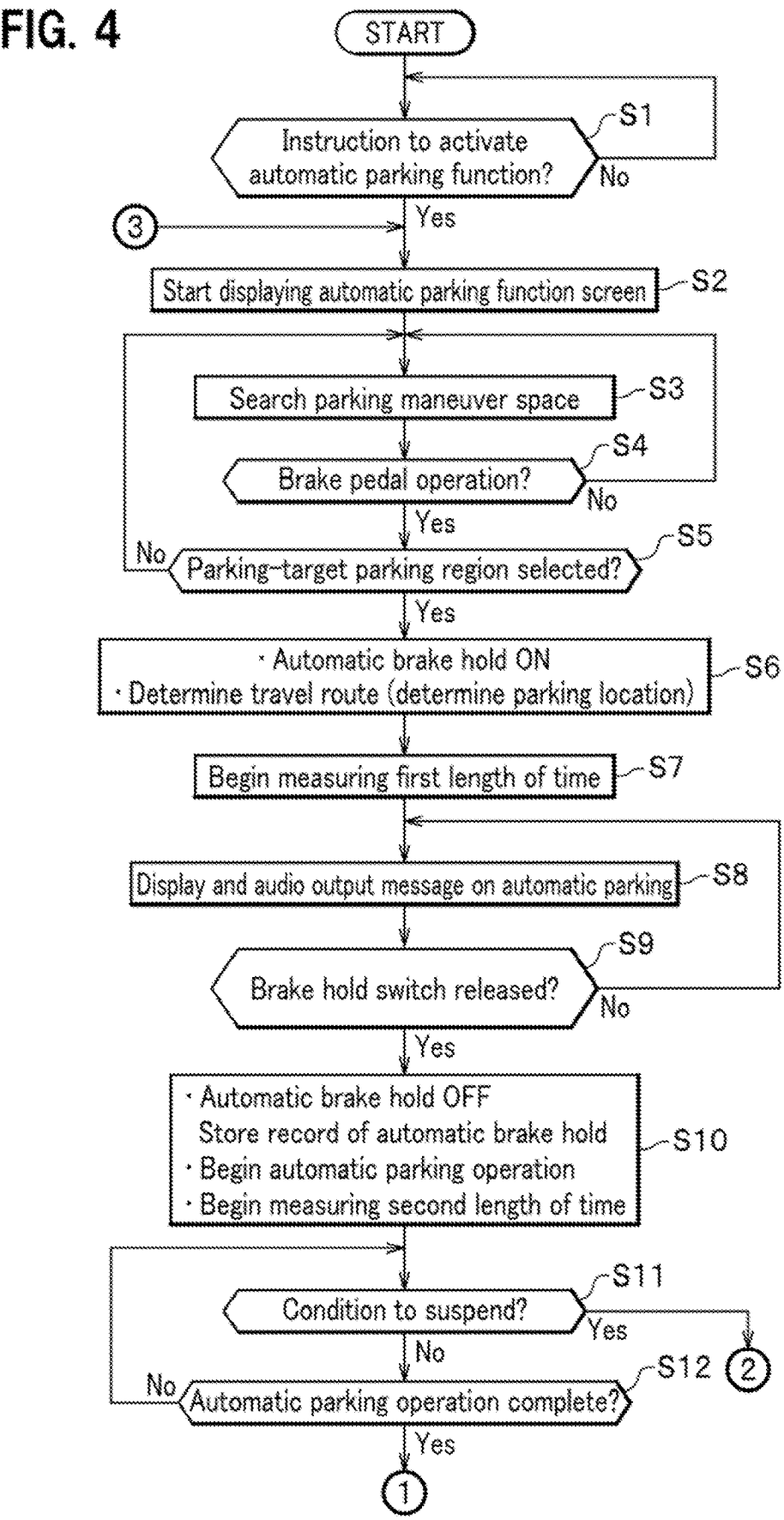
FIG. 4 is a flowchart for explaining a process executed by an automatic parking control unit according to at least one embodiment.
Figure 5A:
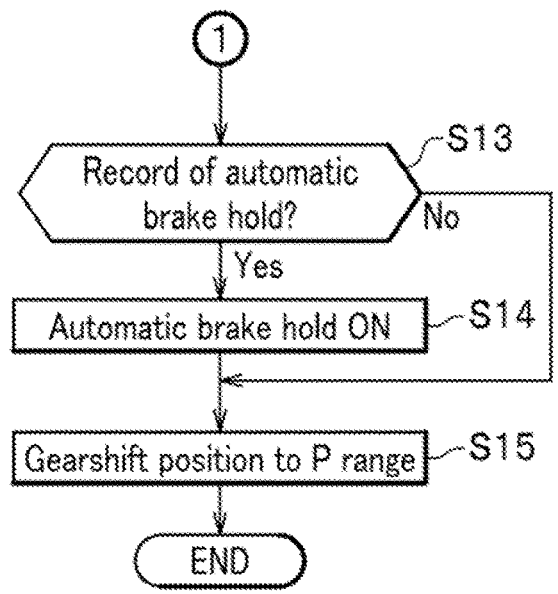
FIGS. 5A and 5B are flowcharts for explaining parts of a process executed by an automatic parking control unit according to at least one embodiment.
Figure 5B:
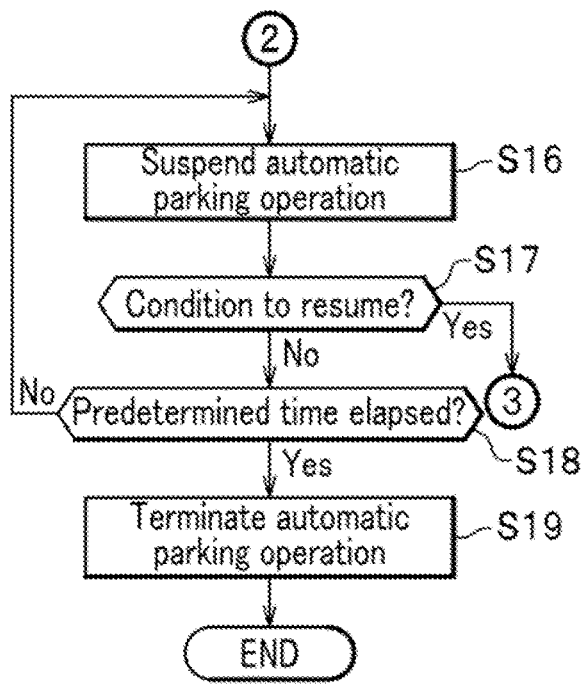

FIGS. 4, 5A, and 5B are flowcharts that explain a process carried out by the automatic parking control unit 1. FIGS. 6-9 are top views of a parking area for describing the process that the automatic parking control unit 1 carries out. Note that the flowcharts illustrate an outline of a series of operational steps described below and does not include every detail of the operational steps that the automatic parking control unit 1 perform. Operations not included in the flowcharts are included in the below description as deemed appropriate.

Figure 6:
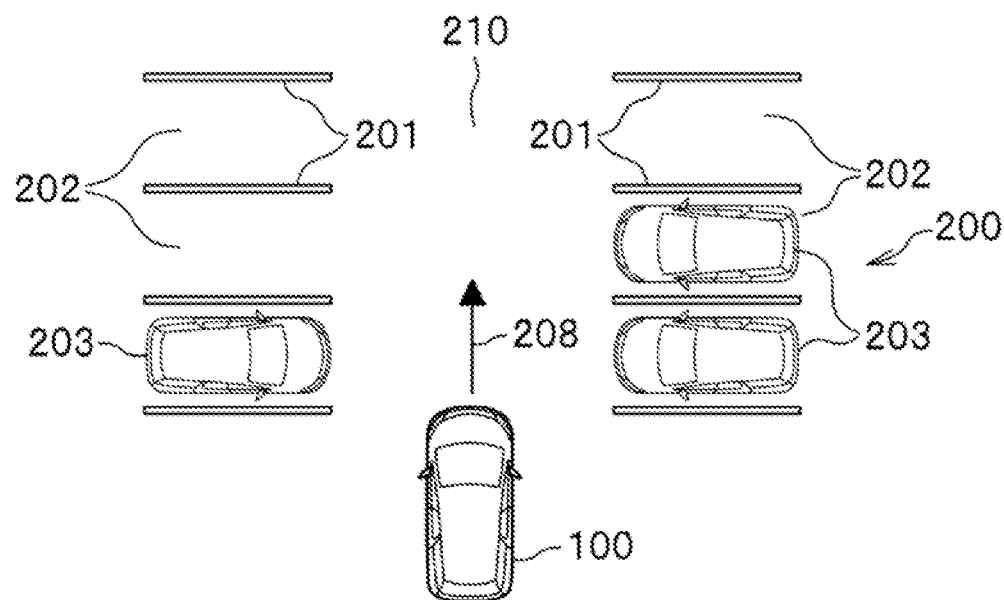
FIG. 6 is a top view of a parking area for explaining a process executed by an automatic parking control unit according to at least one embodiment.

To begin with, as shown in FIG. 6, a driver of the host vehicle 100 drives the host vehicle 100 into a parking area 200 as shown by an arrow indicating a direction of travel 208. During this time, the driver instructs the automatic parking function to be activated by, for example, operating the touch panel 32 ("Yes" of S1). The instruction to activate the automatic parking function is received by the automatic parking controller 13. Upon receiving the instruction, the automatic parking controller 13 displays a predetermined screen for the automatic parking function on the touch panel 32 (S2). Note that during the series of operational steps, various types of automatic parking function screens are displayed as deemed appropriate.

The recognition part 11 makes a combined use of the front camera 21F and the sonar group 22 with a method such as that described above with reference to FIGS. 3A-3C. The recognition information acquired by the recognition part 11 is used by the parking region determiner 12 to search for a parking maneuver space that the host vehicle 100 is able to use when performing a parking maneuver (S3).

Figure 7:
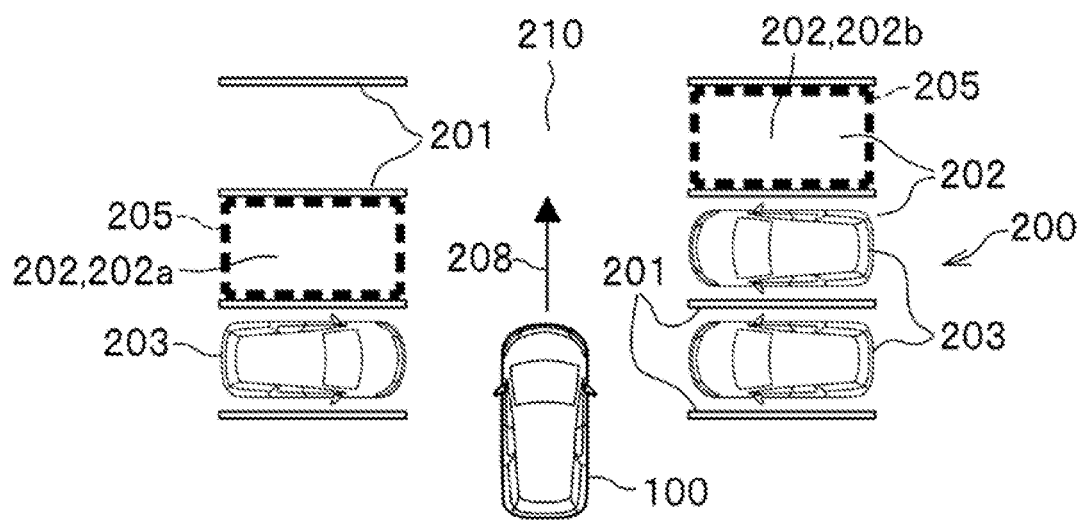
FIG. 7 is a top view of a parking area for explaining a process executed by an automatic parking control unit according to at least one embodiment.

Furthermore in S3, based on the result of the search, the following operations are carried out. First, the parking region determiner 12 determines a parking region (a parking space 202) where the host vehicle 100 is possible to park. In the example of FIG. 7, parking spaces 202a and 202b are candidates for a parking-target parking region. Furthermore, based on the detection results of the front camera 21F and sonar group 22, the automatic parking controller 13 calculates paths that avoid an obstacle for the host vehicle 100 to park in the parking space 202a and in the parking space 202b.

Next, the automatic parking controller 13 estimates the current location of the host vehicle 100 based on the detection results of the inertial sensor 23 and wheel speed sensor 24, Using this location as reference, the automatic parking controller 13 calculates each of the target movement paths of the host vehicle 100 to park in the parking space 202a and in the parking space 202b. The automatic parking controller 13 provides a display on the touch panel 32 of relative locations of the host vehicle 100 and the parking spaces 202a and 202b such as that shown in FIG. 7. For ease of recognition by the driver, the parking spaces 202a and 202b are indicated on a displayed image with a mark such as a frame 205.

Since the "Yes" of S1, the driver has been driving the host vehicle 100 to move through the parking area 200, and during this time the operations of S3 continue to be performed ("No" of S4). However, when the brake pedal (not shown) is operated by the driver ("Yes" of S4) and the host vehicle 100 stops, the parking region determiner 12 performs the following operations. When the driver operates the touch panel 32 and selects one candidate (in this example, the parking space 202a or 202b) as the parking-target parking region ("Yes" of S5), the parking region determiner 12 determines that the selected candidate is the parking-target parking region. The selection may, for example, be carried out by touching a region indicated by a frame 205 mentioned above. When the selection is not made ("No" of S5), the abovementioned operations of 53 are continued. Note that the operational steps of S4 and S5 may be reversed in order.

Figure 8:
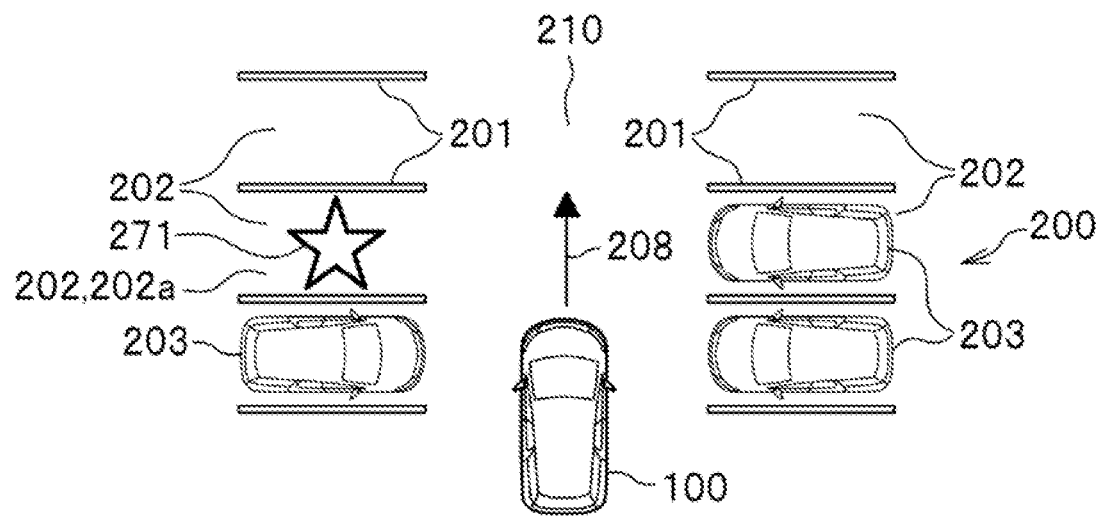
FIG. 8 is a top view of a parking area for explaining a process executed by an automatic parking control unit according to an embodiment.

When the parking-target parking region is determined as above ("Yes" of S5), the parking region determiner 12 displays a mark 271, such as the one shown in FIG. 8, on an image of the parking region (in this example, the parking space 202a) displayed on the touch panel 32.

The automatic parking controller 13 instructs the automatic brake hold controller 44 to turn on the automatic brake hold function (S6). As a result of turning on the automatic brake hold function, the brake state of the host vehicle 100 is automatically maintained when a foot of the driver is removed from the brake pedal (not shown).

Furthermore, a travel route indicated by arrows 263 and 264 in FIG. 3C and a change-to-reverse location indicated by the number "262" also in FIG. 3C are determined by the parking location determiner 14. When the travel route and change-to-reverse location are determined, a parking location within the parking-target parking region that was selected in S5 is determined (S6). The determination process of the parking location is described later.

Subsequently, the automatic parking controller 13 starts measuring an elapsed time, a first length of time, with a timer (S7). Then, the automatic parking controller 13 displays a message on automatic parking on the touch panel 32 and outputs an audio message with the speaker 33 (S8). In some embodiments, the message on automatic parking is output on the touch panel 32 only. The message notified to the driver contains information to the following effect: "The automatic brake hold has been turned on. To begin automatic parking, press the brake hold switch, release your hands from the steering wheel, and remove your foot from the brake pedal".

If the driver follows all the instructions given in the message, the brake hold switch 45 will be pressed thereby releasing the brake hold switch 45 (i.e., the brake hold switch 45 will be released from a "pressed" state: "Yes" of S9). When the brake hold switch 45 is not released ("No" of S9), the abovementioned message continues to be displayed on the touch panel 32.

Note that when a predetermined operation is performed during the operational steps S2-S8 that have been described, the series of operational steps for automatic parking is terminated. This may occur, for example, when the driver operates the automatic parking function screen displayed on the touch panel 32 to terminate the operation of the automatic parking function, or when the driver intentionally operates the gearshift 64.

When the brake hold switch 45 is released ("Yes" of S9), the operations of S10 are carried out. That is, the automatic parking controller 13 instructs the automatic brake hold controller 44 to turn off the automatic brake hold function (S10). This causes the brake on the host vehicle 100 to be released. Furthermore, the automatic parking controller 13 stores a record of operation of the automatic brake hold function in 86 in storage such as a non-volatile memory (S10). Yet further, the automatic parking controller 13 starts the automatic parking operation (810). (Details of the automatic parking operation is described later.) Yet further, the automatic parking controller 13 starts measuring another elapsed time, a second length of time, with a timer (810). Note that when the brake pedal (not shown) is not released, the automatic parking controller 13 performs control as follows. Even when the brake hold switch 45 is released (59), the automatic parking controller 13 does not start the automatic parking operation (S10). The automatic brake hold function (S6) remains turned on.

Figure 9:
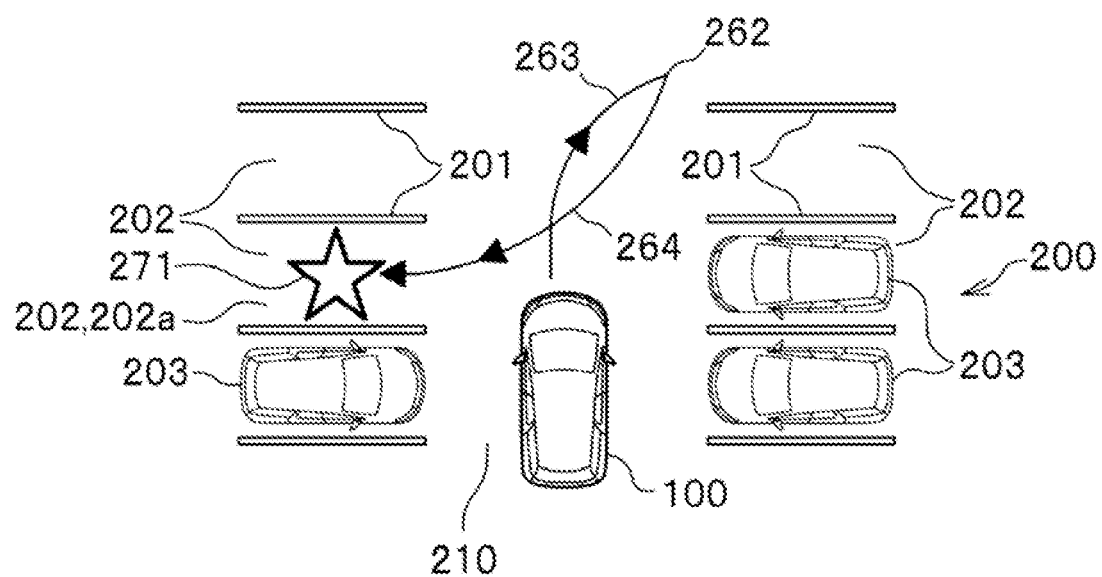
FIG. 9 is a top view of a parking area for explaining a process executed by an automatic parking control unit according to at least one embodiment.

The automatic parking operation started by the automatic parking controller 13 includes the following operations. As shown in FIG. 9, the automatic parking controller 13 controls the host vehicle 100 to travel along the target movement path that has been decided in 53. That is, the automatic parking controller 13 controls the brake system 41, drive system 51, transmission system 61, and EPS system 71, Through this control, the host vehicle 100 reverse parks in the parking space 202a, the parking-target parking region.

Described in more detail, the automatic parking controller 13 controls these systems so that the host vehicle 100 travels forward in D range as shown by the arrow 263 until the change-to-reverse location 262 is reached, at which point the host vehicle 100 stops temporarily. Next, the automatic parking controller 13 controls these systems so that the host vehicle 100 (i) travels backwards in R range and into the parking space 202a, the parking-target parking region, and (ii) stops when the host vehicle 100 has entered the parking space 202a.

Once the automatic parking operation has been started (S10), the automatic parking controller 13 judges whether a condition to suspend the automatic parking function is met while the automatic parking operation is taking place (S11).

In S11, an operation of the steering wheel 72 is one action that meets the condition to suspend the automatic parking function and a shifting of the gearshift 64 to the N range is another action that meets the condition to suspend the automatic parking function.

Furthermore, in S11, the automatic parking controller 13 determines whether the first length of time, whose measurement started in S7, has reached a predetermined length of time. The first length of time is a period of time from when the parking-target parking region is decided (S5, S7) to when the operation to remove the automatic brake hold with the brake hold switch 45 is received ("Yes" of S9), The condition to suspend the automatic parking function is also met if the first length of time is equal to or greater than the predetermined length of time. Yet further, in S11, the automatic parking controller 13 determines whether the second length of time whose measurement started in S10 has reached a predetermined length of time. The second length of time is a period of time from when the brake hold switch 45 is operated ("Yes" of S9) to when a released state of the brake pedal (not shown) is detected. The condition to suspend the automatic parking function is also met if the second length of time is equal to or greater than the predetermined length of time.

Furthermore, the condition to suspend the automatic parking function is also met if, through the driver presence determiner 65, it is determined that a driver seat is without a driver. The driver presence determiner 65 may be configured from a device such as a seating sensor that detects whether a driver is seated in the driver's seat, an on-board camera that takes an image of the vehicle interior (the presence of a seated driver may be determined through image processing), or a door-opening sensor that detects whether the door next to the driver's seat is opened or closed. Yet further, various other conditions under which suspending the automatic parking function is considered sensible may be used as a criterion to meet the condition to suspend the automatic parking function.

When the automatic parking operation is completed with the condition to suspend the automatic parking function not being met ("Yes" of S12), the automatic parking controller 13 outputs a message to notify the completion of the automatic parking operation. The message may be output through the touch panel 32, speaker 33, or the like. The next operational step becomes S13. If the condition to suspend the automatic parking function has been met during the automatic parking operation ("No" of S12), the next operational step becomes S16. The automatic parking operation is complete ("Yes" of S12) when the host vehicle 100 comes to a stop inside the parking-target parking region (in this example, the parking space 202a). The location within the parking region that is selected as the parking location of the host vehicle 100 is based on the decision made in S6 (to be described later).

In S13, the automatic parking controller 13 determines whether a record of an automatic brake hold operation has been stored in S10. If there is a stored record of an automatic brake hold operation ("Yes" of S13), the brake system 41 is controlled to turn on the automatic brake hold function once again. The operational step then advances to S15. Therefore, even if the driver is not pressing down on the brake pedal (not shown), the host vehicle 100 is applied with a brake and stops. If there is no stored record ("No" of S13), the process advances to S15. In this case, the automatic brake hold function stays turned off. An example of when a record of an automatic brake hold operation is not stored is when, even though the automatic brake hold function is turned on in S6, the driver operates the brake hold switch 45 to turn off the function. In S15, the automatic parking controller 13 controls the gearshift 64 so that gearshift position shifts to the P range to end the automatic parking.

Figure 10:
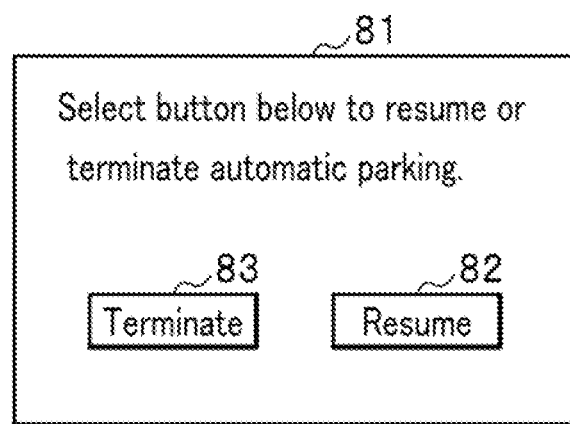
FIG. 10 is a plan view of a selection screen that is displayed on a touch panel by a process that is executed by an automatic parking control unit according to at least one embodiment.

In S16, on the other hand, because the condition to suspend the automatic parking function has been met ("Yes" of S11), the automatic parking controller 13 suspends the automatic parking function. Then, the automatic parking controller 13 determines whether a condition to resume the automatic parking function exists (S17) A condition to resume exists if a predetermined criterion is met. The predetermined criterion may be met if a predetermined operation is carried out on a selection screen 81 of FIG. 10, the selection screen 81 being one type of automatic parking function screens that are displayed on the touch panel 32. The selection screen 81 displays a "Resume" button 82 and "Terminate" button 83. If the driver operates the "Resume" button 82, the predetermined criterion is met and the condition to resume the automatic parking function exists. If the "Terminate" button 83 is operated, then a termination of the automatic parking function is selected.

If the condition to resume the automatic parking function exists ("Yes" of S17), the process returns to S2 and the automatic parking function resumes. If a predetermined amount of time elapses without the condition to resume the automatic parking function arising ("No" of S17 and "Yes" of S18), the automatic parking controller 13 makes a decision to terminate the automatic parking function (S19), and the series of operational steps comes to an end. If the predetermined amount of time has not yet elapsed and the condition to resume the automatic parking function has not arisen ("No" of S17 and "No" of S18), the automatic parking controller 13 returns to S16. Note that if the "Terminate" button 83 is operated, the automatic parking controller 13 may terminate the automatic parking function without waiting for the predetermined amount of time referred to in S18 to elapse.

Note that when the condition to suspend the automatic parking function exists ("Yes" of S11), the automatic parking controller 13 may resume the automatic parking function from S2 if the condition to resume the automatic parking function is met ("Yes" of S17). On the other hand, if a condition to terminate is met during the series of operations of the automatic parking function, the automatic parking controller 13 terminates the process of FIGS. 4 and 5 and does not resume the process. When the automatic parking function is to start again, the automatic parking controller 13 begins the operational steps from S1. The "condition to terminate" may be met if, for example, one of the following criteria is met during the series of operations of the automatic parking function: (a) the gearshift 64 is shifted to a P range; (b) an electric park brake comes into operation; and (c) an instruction to operate the parking brake function has been input via the touch panel 32. Furthermore, if a condition to halt the automatic parking function is met during the series of operations of the automatic parking function, the series of operations of the automatic parking function is brought to a halt. However, in this case, the series of operations of the automatic parking function is resumed from the point at which the operation has been halted if the condition to halt is removed. The "condition to halt" exists if a criterion is met such as an operation of the brake pedal (not shown).

Figure 11:
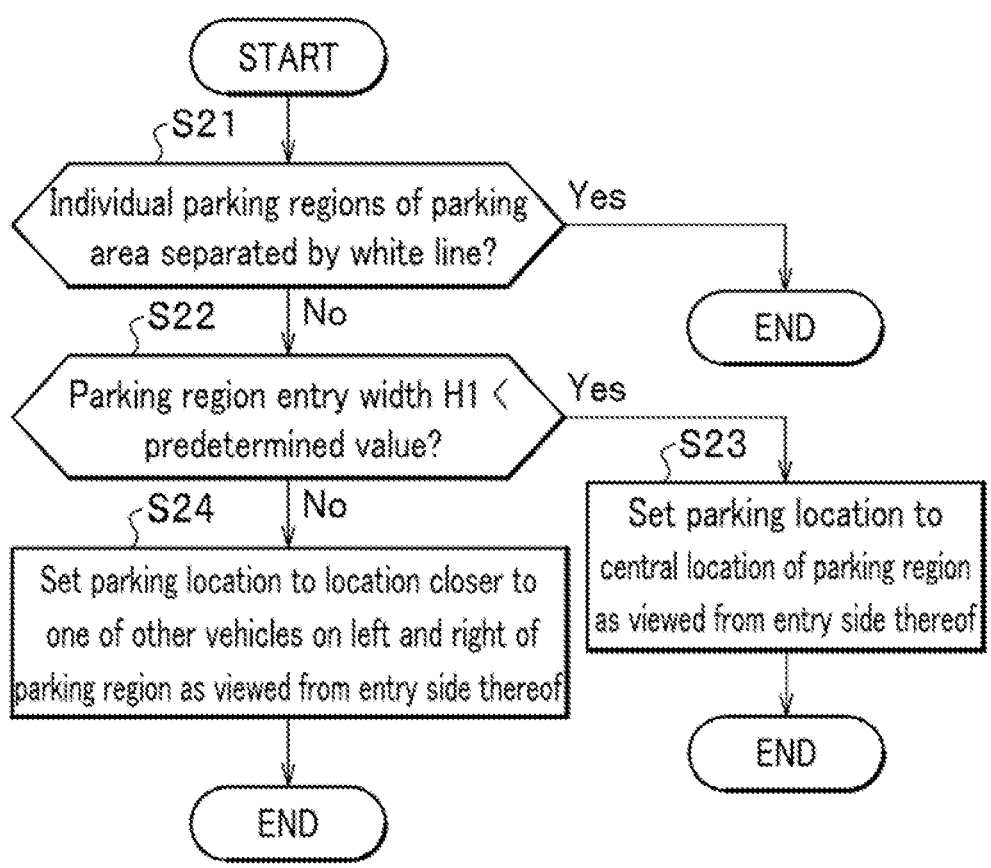
FIG. 11 is a flowchart of a subroutine for a parking location determination process of 56 that is executed by an automatic parking control unit according to at least one embodiment.

FIG. 11 is a flowchart of a subroutine for the determination process of a parking location of S6 in FIG. 4. Words expressing directions such as "front" and "rear" are used to describe directions from the viewpoint of the host vehicle 100 that is pausing at the change-to-reverse location 262 (see FIG. 9). The process of FIG. 11 is performed based on a situation of the surroundings of the host vehicle 100 as recognized by the recognition part 11. The operational steps of FIG. 11 is executed when individual parking regions of the parking area 200 is not separated by a white line 201 (a boundary line, see FIG. 3C). The parking location determiner 14 determines whether the parking area 200 has parking regions that are separated by a white line 301 (a boundary line) (S21). If the parking area 200 does not have parking regions separated by a white line (a boundary line) ("No" of S21), the following operational steps are executed.

Figure 12:
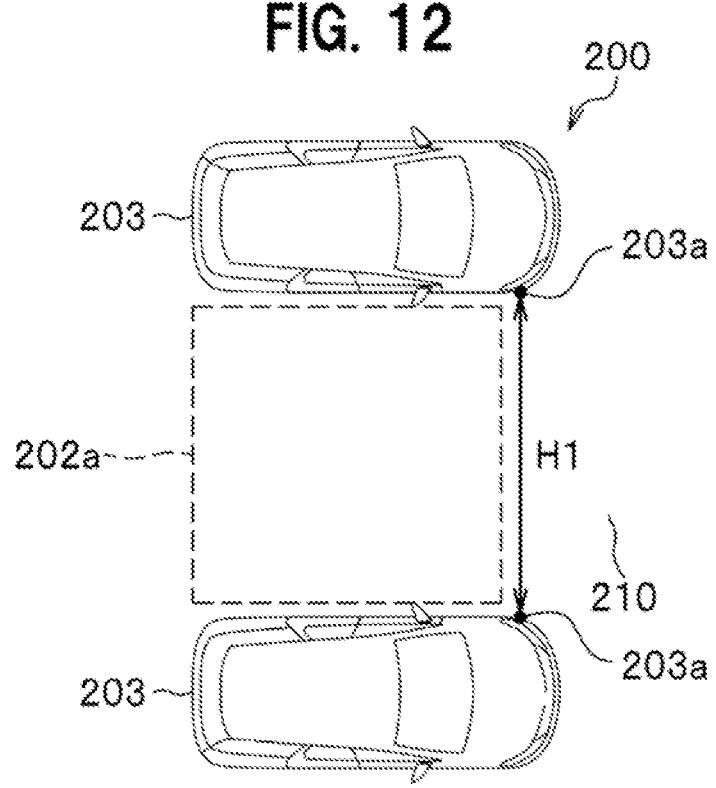
FIG. 12 is a plan view of a parking area for explaining a parking location determination process of S6 that is executed by an automatic parking control unit according to at least one embodiment.

As shown in FIG. 12, even when the parking area 200 does not have a white line 201 (a boundary line) separating parking regions, the parking region determiner 12 finds a parking space 202a based on the surrounding situation of the host vehicle 100 as recognized by the recognition part 11 so that the driver may select this parking space 202a as the parking-target parking region. In this case, an entry width H1 of the parking space 202a may be detected from the recognition result of the recognition part 11, Other vehicles 203 are parked on the left and right sides of the parking space 202a. When a space is found between the pair of other vehicles 203 and when, from the width of entry and depth of the space, it is determined that there is appropriate space for parking the host vehicle 100, then that space becomes selectable as a parking space 202a (a parking region) for parking the host vehicle 100 ("Yes" of S5).

Figure 13:
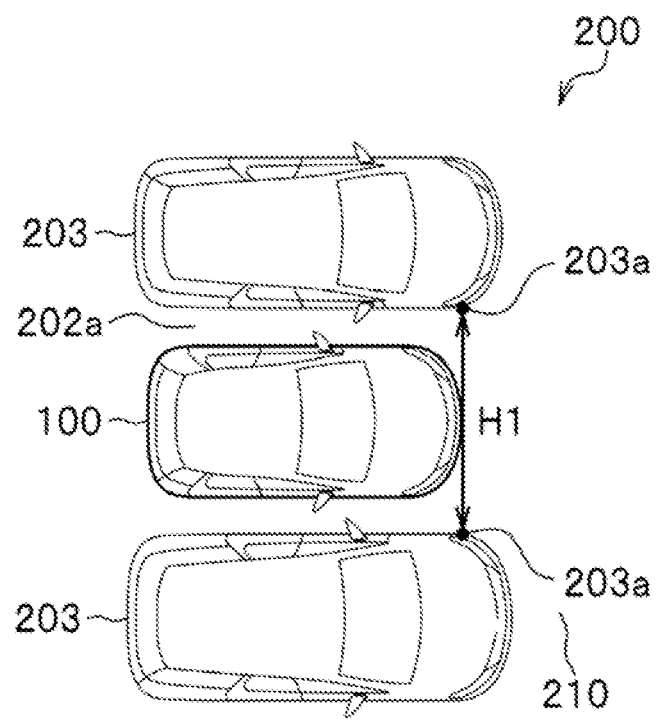
FIG. 13 is a plan view of a parking area for explaining a parking location determination process of S6 that is executed by an automatic parking control unit according to at least one embodiment.

When the parking space 202a of FIG. 12 is selected as the parking-target parking region for the "Yes" of S5, the parking location determiner 14 determines whether the entry width H1 of the parking space 202a (a parking region) is less than a predetermined value (S22). This predetermined value may, for example, be 1.5 times the width of the host vehicle 100. When the entry width H1 of the parking space 202a is less than the predetermined value ("Yes" of S22), the parking location determiner 14 determines that the parking location of the host vehicle 100 within the parking space 202a (a parking region) is at a central location as viewed from the entry side of the parking space 202a (a parking region) (S23). Therefore, as shown in FIG. 13, the central location of the parking space 202a (a parking region) as viewed from the entry side thereof (i.e., a location that is equally distanced from the other vehicle 203 on the left side and the other vehicle 203 on the right side of the parking space 202a) is decided as the parking location of the host vehicle 100.

When determining whether the entry width H1 of the parking space 202a (a parking region) is less than the predetermined value in S22, the parking location determiner 14 uses an outer edge part of a side of the other vehicle 203 on the left side of the parking space 202a and an outer edge part of a side of the other vehicle 203 on the right side of the parking space 202a (in the given example, corners 203a) as reference points of the entry width H1.

When the entry width H1 of the parking space 202a is equal to or greater than the predetermined value ("No" of S22), then as shown in FIG. 14, the parking location determiner 14 determines that the parking location of the host vehicle 100 is at a location that is closer to one of the other vehicles 203 on the left and right sides of the parking space 202a (a parking region) as viewed from the entry side of the parking space 202a (S24).

In some embodiments, the parking location determiner 14 sets a distance by which the parking location of the host vehicle 100 is shifted (hereinafter also a "shift distance") to a predetermined distance H2, the predetermined distance H2 being a distance from a line L extending lengthways from a central point of the parking space 202a (a parking region) as viewed from the entry side thereof to the rear side of the parking region. (In other words, the predetermined distance H2 is a distance away from the center of the parking space 202a in the direction of width of the parking region.) In some embodiments, the parking location is selected so that there is a predetermined space between the host vehicle 100 and the other vehicle 203 that the host vehicle 100 is parked closer to, the predetermined space providing enough space to enable doors to be opened and passengers to get in and out of within that predetermined space.

In the example of FIG. 14, a stopping location of the host vehicle 100 is determined to be at a location closer to the other vehicle 203 on the right as viewed from the driver of the host vehicle 100. In some embodiments, the parking location determiner 14 decides on which of the other vehicles 203 on the left and right sides of the parking space 202a the host vehicle 100 is to park closer to based on a position of the host vehicle 100. For example, the parking location may be determined so that the host vehicle 100 parks closer to the other vehicle 203 that is closest to a position of the host vehicle 100 when the automatic brake hold is turned on and the host vehicle 100 has stopped (S6).

In some embodiments, when the parking location determiner 14 decides on which of the other vehicles 203 on the left and right sides of a parking region the host vehicle 100 is to park closer to, a decision according to a ground surface condition of the parking area 200 in which the host vehicle 100 performs the parking operation may be prioritized (priority to a ground surface condition). In this case, a parking location does not have to be closer to the other vehicle 203 that is closest to the position that the host vehicle 100 has stopped. To be more specific, when the camera group 21 (FIG. 1) detects that the ground on which the host vehicle 100 travels has an uneven surface and when a means of better avoiding uneven parts of the ground for the travel route or parking location that are determined in S6 is to park the host vehicle 100 closer to a particular one of the other vehicles 203, then a parking location that is closer to the particular one of the other vehicles 203 is selected as the parking location of the host vehicle 100.

In some embodiments, when the parking location determiner 14 decides on which of the other vehicles 203 on the left and right sides of a parking region the host vehicle 100 is to park closer to, a decision according to types of the other vehicles 203 may be prioritized (priority to vehicle types). In this case, a parking location does not have to be closer to the other vehicle 203 that is closest to the position that the host vehicle 100 has stopped. To be more specific, a parking location that is closer to a smaller sized one of the other vehicles 203 on the left and right sides is selected so that a larger sized vehicle is avoided.

Note that in, the above description of the process of FIG. 11, operational steps when the parking area 200 does not have a white line 201 (a boundary line) separating parking regions have been described. In cases where the parking area 200 has a white line 201 (a boundary line) separating parking regions, various algorithms may be used to determine a parking location. In some embodiments, a parking location within a parking region is decided so that the host vehicle 100 is equally distanced from the left and right white lines 201 that demarcate the parking region. Furthermore, the parking location determination described above has been concerned with determining a parking location in a direction to the left or right as viewed from the driver of the host vehicle 100. To determine the parking location in a direction to the front or back (as viewed from the driver), various algorithms may be used such as (a) selecting a location that avoids an obstacle at the back of the host vehicle 100 such as another vehicle, or (b) selecting a location so that the rear end of the host vehicle 100 is aligned with the rear ends of the other vehicles 203 on the left and right.

In the example that has been described, a process in which the host vehicle 100 enters the parking space 202a (a parking region) from the rear end of the host vehicle 100 first (i.e., reverse parking). In some embodiments, the host vehicle 100 may enter the parking space 202a (a parking region) from the front end of the host vehicle 100 first (i.e., forward parking).

According to the automatic parking control unit 1 described above, when the entry width H1 of the parking space 202a is less than a predetermined value ("Yes" of S22), a location at the center of the parking space 202a as seen from the entry side thereof is determined by the parking location determiner 14 as the parking location of the host vehicle 100 within the parking space 202a (a parking region). In this way, when parking in a parking region with confined space to the left and right relative to the host vehicle 100, the host vehicle 100 is able to park with adequate distance from other vehicles 203 on the right and the left.

In this case, during the decision of S22, the parking location determiner 14 is able to measure an entry width H1 of the parking space 202a (a parking region) appropriately by using two reference points. One reference point is set to an outer edge part of a side of one of the other vehicles 203 on the left and right (a corner 203a for this example). The other reference point is set to an outer edge part of a side of the other one of the other vehicles 203 on the left and right (another corner 203a for this example).

When the entry width H1 of the parking space 202a is equal to or greater than a predetermined value ("No" of S22), the parking location, determiner 14 determines a parking location of the host vehicle 100 that is closer to one of the other vehicles 203 on the left and right of the parking space 202a (a parking region) as viewed from the entry side thereof (S24). In this way, a wider space is made available between the host vehicle 100 and the other one of the other vehicles 203 on the left and right (i.e., the other vehicle 203 from which the parking location is shifted away). When this other one of the other vehicles 203 on the left and right leaves, a different other vehicle may use the wide space to park reasonably closely to the host vehicle 100 (with enough space between the different other vehicle and the host vehicle 100 to allow vehicle doors to open and for passengers to get in and out). In this way, the parking location of the host vehicle 100 that is determined by the automatic parking control unit 1 allows efficient use of space that is available for parking in the parking area 200.

In one or more embodiments, the parking location determiner 14 sets the distance by which the parking location of the host vehicle 100 is shifted to a predetermined distance H2 from a line L that is extended from a central point of the parking space 202a (a parking region) as viewed from the entry side thereof to the rear side of the parking region (hence the predetermined distance H2 is a distance in the direction of a vehicle width from a midsection as shown in FIG. 14). Therefore, a location may be selected as the parking location of the host vehicle 100 that is not too close to the other vehicle 203 to which side the host vehicle 100 is shifted. In one or more embodiments, the parking location is selected so that there is a predetermined space between the host vehicle 100 and the other vehicle 203 that the host vehicle 100 is shifted closer to so that the predetermined space allows doors to be opened and passengers to get into and out of vehicles in the predetermined space.

In one or more embodiments, when deciding on which of the other vehicles 203 on the left and right the host vehicle 100 is to park closer to, the parking location determiner 14 bases the decision on the current position of the host vehicle 100. More specifically, for example, a parking location is determined so that the host vehicle 100 parks closer to the other vehicle 203 that is closest to a position at which the host vehicle 100 has stopped. In this way, the distance the host vehicle 100 is driven while performing a parking operation is minimized, reducing the disturbance the parking operation may cause to other vehicles and pedestrians and contributing to reducing the consumption of fuel (or electricity).

In one or more embodiments, when the parking location determiner 14 decides on which of the other vehicles 203 on the left and right the host vehicle 100 is to park closer to, a decision according to a ground surface condition of the parking area 200 in which the host vehicle 100 performs the parking operation may be prioritized. Therefore, by avoiding a path with an uneven surface, the automatic parking control unit 1 may avoid a decline in the quality of ride on the host vehicle 100 during the parking operation.

In one or more embodiments, when the parking location determiner 14 decides on which of the other vehicles 203 on the left and right the host vehicle 100 is to park closer to, a decision according to types of the other vehicles 203 may be prioritized. More specifically, a parking location may be determined so that a larger vehicle is avoided by parking the host vehicle 100 closer to a smaller one of the other vehicles 203. Large sized vehicles require wider space to maneuver and are more likely to come into contact with the host vehicle 100 when they leave a parking space compared to smaller sized vehicles. Parking closer to a smaller vehicle, therefore, reduces the likelihood of such a collision with a large sized vehicle.

What is claimed is:

1. A parking assistance device comprising:
a recognition part configured to acquire recognition information through recognition of surroundings of a host vehicle;
a parking region determiner configured to determine a space between other vehicles as a parking region of the host vehicle based on the recognition information;
an automatic parking controller configured to perform a parking operation to park the host vehicle in the parking region; and
a parking location determiner configured to determine a parking location of the host vehicle in the parking region, wherein
in response to determining that an entry width of the parking region is less than a predetermined value, the parking location determiner is configured to determine the parking location that is at a central location as viewed from an entry side of the parking region,
in response to determining that the entry width is equal to or greater than the predetermined value, the parking location determiner is configured to determine the parking location that is closer to one of the other vehicles as viewed from the entry side of the parking region, and
the parking location determiner is configured to decide on which of the other vehicles the parking location is to be closer to by prioritizing a ground surface condition of a parking area where the host vehicle performs the parking operation.

2. The parking assistance device according to claim 1, wherein
in response to determining that the entry width is equal to or greater than the predetermined value, the parking location determiner is configured to set the parking location that is closer to the one of the other vehicles as viewed from the entry side of the parking region so that there is a predetermined space between the parking location and the one of the other vehicles.

3. The parking assistance device according to claim 1, wherein
in response to determining that the entry width is equal to or greater than the predetermined value, the parking location determiner is configured to set a shift distance to a predetermined distance, wherein
the shift distance is a distance by which the parking location is shifted to be closer to the one of the other vehicles in a vehicle-width direction from a center of the parking region as viewed from the entry side.

4. The parking assistance device according to claim 1, wherein
the parking location determiner is configured to select an outer edge part of a side of each of the other vehicles as a reference point of the entry width of the parking region.

5. The parking assistance device according to claim 1, wherein
the parking location determiner is configured to decide on which of the other vehicles the parking location is to be closer to based on a current location of the host vehicle.

6. The parking assistance device according to claim 1, wherein
the parking location determiner is configured to decide on which of the other vehicles the parking location is to be closer to by prioritizing a type of each of the other vehicles.

7. A parking assistance method comprising:
acquiring, with a recognition part, recognition information through recognition of surroundings of a host vehicle;
determining a space, with a parking region determiner, between other vehicles as a parking region of the host vehicle based on the recognition information;
performing, with an automatic parking controller, a parking operation to park the host vehicle in the parking region; and
determining a parking location of the host vehicle, with a parking location determiner, in the parking region, wherein
the determining the parking location of the host vehicle comprises, in response to determining that an entry width of the parking region is less than a predetermined value, determining the parking location that is at a central location as viewed from an entry side of the parking region,
the determining the parking location of the host vehicle further comprises, in response to determining that the entry width is equal to or greater than the predetermined value, determining the parking location that is closer to one of the other vehicles as viewed from the entry side of the parking region, and
the determining the parking location that is closer to one of the other vehicles includes deciding on which of the other vehicles the parking location is to be closer to by prioritizing a ground surface condition of a parking area where the host vehicle performs the parking operation.

8. A computer program product including a non-transitory computer readable medium having instructions stored thereon that, when executed by one or more processors, cause the one or more processors to perform operations comprising:
acquiring recognition information through recognition of surroundings of a host vehicle;
determining a space between other vehicles as a parking region of the host vehicle based on the recognition information;
performing a parking operation to park the host vehicle in the parking region; and
determining a parking location of the host vehicle in the parking region, wherein
the determining the parking location of the host vehicle comprises, in response to determining that an entry width of the parking region is less than a predetermined value, determining the parking location that is at a central location as viewed from an entry side of the parking region,
the determining the parking location of the host vehicle further comprises, in response to determining that the entry width is equal to or greater than the predetermined value, determining the parking location that is closer to one of the other vehicles as viewed from the entry side of the parking region, and
the determining the parking location of the host vehicle further comprises deciding on which of the other vehicles the parking location is to be closer to by prioritizing a ground surface condition of a parking area where the host vehicle performs the parking operation.

9. The computer program product according to claim 8, wherein
the determining the parking location of the host vehicle further comprises, in response to determining that the entry width is equal to or greater than the predetermined value, setting the parking location that is closer to the one of the other vehicles as viewed from the entry side of the parking region so that there is a predetermined space between the parking location and the one of the other vehicles.

10. The computer program product according to claim 8, wherein the determining the parking location of the host vehicle further comprises, in response to determining that the entry width is equal to or greater than the predetermined value, setting a shift distance to a predetermined distance, wherein the shift distance is a distance by which the parking location is shifted to be closer to the one of the other vehicles in a vehicle-width direction from a center of the parking region as viewed from the entry side.

11. The computer program product according to claim 8, wherein the determining the parking location of the host vehicle further comprises selecting an outer edge part of a side of each of the other vehicles as a reference point of the entry width of the parking region.

12. The computer program product according to claim 8, wherein the determining the parking location of the host vehicle further comprises deciding on which of the other vehicles the parking location is to be closer to based on a current location of the host vehicle.

13. The computer program product according to claim 8, wherein the determining the parking location of the host vehicle further comprises deciding on which of the other vehicles the parking location is to be closer to by prioritizing a type of each of the other vehicles.

* * * * *